United States Patent [19]

Sherbondy et al.

[11] Patent Number: 5,433,886
[45] Date of Patent: Jul. 18, 1995

[54] STABILIZATION OF POLYETHER POLYAMINO METHYLENE PHOSPHONATE SCALE INHIBITORS AGAINST DEGRADATION BY BROMINE AND CHLORINE BIOCIDES

[75] Inventors: Ann M. Sherbondy, Pittsburgh; Daniel P. Vanderpool, Coraopolis, both of Pa.

[73] Assignee: Calgon Corporation, Pittsburgh, Pa.

[21] Appl. No.: 879,639

[22] Filed: May 7, 1992

[51] Int. Cl.$^6$ .............................. C02F 5/04; C02F 5/14
[52] U.S. Cl. .................................... 252/180; 252/181; 210/699
[58] Field of Search .............. 252/180, 181, 142, 102, 252/188.2; 210/699, 755

[56] References Cited

U.S. PATENT DOCUMENTS

| | | | |
|---|---|---|---|
| 2,552,490 | 5/1951 | Marks et al. | 210/755 |
| 2,552,491 | 5/1951 | Marks et al. | 210/755 |
| 3,170,883 | 2/1965 | Owen et al. | 252/142 |
| 3,558,503 | 1/1971 | Goodenough et al. | 210/755 |
| 4,642,194 | 2/1987 | Johnson | 210/699 |
| 4,673,509 | 6/1987 | Davis et al. | 210/699 |
| 4,711,724 | 12/1987 | Johnson | 210/699 |
| 4,759,852 | 7/1988 | Trulear | 210/699 |
| 4,931,189 | 6/1990 | Dhawan et al. | 252/180 |
| 5,049,304 | 9/1991 | Greaves | 252/186 |
| 5,069,798 | 12/1991 | Hwa et al. | 252/180 |
| 5,087,367 | 2/1992 | Bendiksen et al. | 252/180 |
| 5,093,005 | 3/1992 | Greaves et al. | 252/180 |

*Primary Examiner*—Prince Willis, Jr.
*Assistant Examiner*—J. Silbermann
*Attorney, Agent, or Firm*—Craig G. Cochenour; William C. Mitchell; Raymond M. Speer

[57] ABSTRACT

Polyether polyamino methylene phosphonates, which possess high calcium tolerance and have been found to give excellent inhibition of the formation, deposition and adherence of scale-forming salts, especially calcium carbonate, in aqueous systems involving severe conditions which include elevated pH, high dissolved solids content, and high saturation levels of calcium carbonate, are degraded by the oxidizing biocides bromine and chlorine used to control microbial growth in such aqueous systems. It has been found that organic sulfonamides provide excellent protection against such degradation when they are added to the aqueous system along with the polyether polyamino methylene phosphonate scale inhibitors.

8 Claims, No Drawings

STABILIZATION OF POLYETHER POLYAMINO METHYLENE PHOSPHONATE SCALE INHIBITORS AGAINST DEGRADATION BY BROMINE AND CHLORINE BIOCIDES

BACKGROUND OF THE INVENTION

Field of the Invention

The present invention relates to compositions and methods for inhibiting the degradation of polyether polyamino methylene phosphonate scale inhibitors by the oxidizing biocides bromine and chlorine in an aqueous system where said phosphonates have been added to prevent the formation, deposition and adherence of alkaline earth metal scale deposits, especially calcium carbonate ($CaCO_3$) scale deposits, on metallic surfaces of said aqueous systems, especially under conditions of high pH and high calcite concentration, e.g., those found in cycled up recirculating cooling systems, where the biocide, most likely bromine, has been added to said aqueous system in order to control the growth of microbes in said system.

In order for the polyether polyamino methylene phosphonate scale inhibiting compositions described further below to prevent the formation and deposition of scale in such an aqueous system, they must maintain a level of resistance to degradation by the oxidizing biocide, especially bromine. This is of particular importance in cooling systems such as those using cycled up recirculating cooling towers, where bromine is usually used in preference to chlorine.

Such systems maintain a large body of water for a considerable length of time exposed to the atmosphere under conditions which do not include sufficient aeration and exposure to sunlight to provide control of microbial, especially bacterial and fungal, growth. In particular, many cooling towers use fill composed of beads of synthetic polymer or other materials, in order to extend the amount of heat exchange surface area, and this type of construction greatly aggravates the problem of microbiological growth, since it provides an ideal physical environment for the propagation of troublesome microbes. Unchecked, such microorganisms flourish and produce colonies extensive enough to give rise to problems of biofilm blockage of heat exchange surfaces, as well as clogging of the components of the water transporting apparatus used in operating the cooling system.

As already indicated, such problems of unwanted microbial growth in a cooling system are usually solved by use of an oxidizing biocide, especially chlorine or bromine, since these are inexpensive, effective, and produce minimal environmental impact. However, as is well known, such oxidizing biocides also tend to degrade scale inhibitors containing an N-phosphonomethylene group, presumably by oxidative attack on the nitrogen atom of the group, with resultant cleavage through the methylene linking group and release of phosphate $PO_4^{-3}$ ions. This attack on the polyether polyamino methylene phosphonate scale inhibitor produces detrimental results in three ways. First, there is a loss of the phosphonate scale inhibitor product itself, with consequent scale buildup Second the $PO_4^{-3}$ ions which are released react with calcium cations to form calcium phosphate scale, a very hard and intractable scale Third the $PO_4^{-3}$ ions also adversely modify the adherence properties of the calcium carbonate scale whose formation and deposition the phosphonate scale inhibitor was intended to prevent in the first place.

The Polyether Polyamino Methylene Phosphonate Scale Inhibitors and Their Use in Controlling Calcium Carbonate Scale under Severe Conditions Generally, calcium carbonate scale deposits are incrustation coatings which accumulate on the metallic surfaces of a water-carrying system through a number of different causes.

Various industrial and commercial water-carrying systems are subject to calcium carbonate scale formation problems. Calcium carbonate scale is of particular concern in heat exchange systems employing water, such as, for example, boiler systems, and once-through and open recirculating water cooling systems. Cooling towers are especially significant, particularly where severe conditions, including high pH and high calcite concentrations are encountered.

For cooling systems and similar heat exchange systems including cooling towers, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. Precipitation is also favored on the heat transfer surface because of the inverse solubility relationship of calcium carbonate. As a result, the Solubility of the scale-forming calcium carbonate salt reaction product is first exceeded in this thin film, and crystallization of calcium carbonate scale results directly on the heating or heat exchange surface.

The chief factor which promotes calcium carbonate scale formation is concentration of solids dissolved in the water by repeated evaporation of portions of the water phase. Thus, even a water which is not scale forming on a once-through basis usually will become scale forming when concentrated two, four, or six times. Moreover, alkalinity of the makeup water, with evaporative cycles over time results in an increasing alkalinity of the water in the overall system, often reaching pH's of 8.5–9.5 and even higher.

Because the formation of calcium carbonate scale deposits poses a serious problem with regard to retarded heat transfer, underdeposit corrosive processes, and material interference with fluid flow, and because control of calcium carbonate scale under severe conditions of high pH and high calcite concentrations make most conventional scale inhibitors ineffective, the polyether polyamino methylene phosphonates described herein can be used in the same range of amounts as threshold inhibitors to prevent the formation and deposition of calcium carbonate scale. They also have dispersant properties as well and significantly reduce the adherency of any calcium carbonate scale deposit which is formed, facilitating its easy removal.

Current technology in scale control can be used to inhibit $CaCO_3$ scale up to 100 to 120 times calcite saturation, i.e., a water containing $Ca^{2+}$ and $CO_3^{2-}$ present at 100 times (100$\times$) their solubility limit of calcium as calcite (calcite is the most common crystalline form of calcium carbonate). However, what is desired are inhibitors effective in greater than 150$\times$ water, especially in greater than 250$\times$ water, and more especially in greater than 300 $\times$water, i.e., where the calcite ions can be prevented from precipitating as calcium carbonate scale using substoichiometric amounts of an inhibitor. The polyether polyamino methylene phosphonates described herein are especially useful under severe conditions characterized by a calcite saturation level of 150× and above, especially 250× and above, and more especially 300× and above, as defined in the paragraph immediately below.

Severity of the scaling tendency of a water sample is measured using the saturation index, which may be derived in accordance with the following equation:

$$SI = \frac{[Ca^{2+}][CO_3^{2-}]}{K_{spCaCO_3}}$$

where SI is the saturation index for calcium carbonate, $[Ca^{2+}]$ is the concentration of free calcium ions, $[CO_3^{2-}]$ is the concentration of free carbonate ions, and $K_{spCaCO_3}$ is the conditional solubility product constant for $CaCO_3$. All of the quantities on the right side of the above equation are adjusted for pH, temperature and ionic strength.

Calculation and use of the saturation index, and generation of the data from which it is derived, are matters within the skill of the art. See, for example, *Critical Stability Constants*, Vol. 4: "Inorganic Complexes", Smith & Mantell (1976), Plenum Press; and *Aquatic Chemistry*, Chap. 5, 2nd ed., Stumm & Morgan (1981), Wiley & Sons.

Another characteristic feature of the severe conditions under which the polyether polyamino methylene phosphonates described herein are especially useful is high pH, i.e. a pH of 8.5 and higher, particularly a pH of 9 or 10 or even higher. A related feature of such severe conditions is high alkalinity.

One of the particular advantages of the polyether polyamino methylene phosphonates described herein is the exceptional calcium tolerances which they exhibit. Calcium tolerance is a measure of a chemical compound's ability to remain soluble in the presence of calcium ions ($Ca^{2+}$). One of the parameters of scale control under severe conditions is pH. As pH increases, calcium tolerance decreases.

The N-oxides of the polyether polyamino methylene phosphonates described herein are contemplated to experience little, if any, degradation in the presence of chlorine and bromine biocides, since access to the nitrogen atom is blocked by the presence of the oxygen atom. However, as is explained in more detail further below, during the process of making the polyether polyamino methylene phosphonates, unreacted starting materials and various side products are allowed to remain rather than being separated, for economic reasons. However, many of these materials can be degraded by the chlorine or bromine in the same way as the scale inhibiting phosphonate products releasing $PO_4^{-3}$ ions with the detrimental effects discussed above. Consequently, the organic sulfonamides of the present invention which are useful for inhibiting the degradation of the polyether polyamino methylene phosphonate scale inhibitors, are also contemplated for use with the N-oxides of those phosphonates, even though the latter are not subject to degradative attack by chlorine and bromine.

Chlorine and Bromine Biocides

Chlorine and bromine are the most frequently used oxidizing biocides in aqueous systems where an antifouling agent is necessary to control the growth of microorganisms, as has already been described further above. The biocidal activity of low concentrations of chlorine and bromine in water is influenced to a considerable extent by factors such as pH, temperature, and the presence of other halides and nitrogen compounds. An important consideration in choosing one halogen over the other is the effect of pH on shifting of the equilibrium mixture formed by reaction of the halogen with water to give the halogen, the strongly dissociated hydrogen halide, and the weakly dissociated hypohalous acid.

Because bromine has higher biocidal efficiency than chlorine at the high pH's (8.5 and above) encountered in aqueous systems such as cooling towers, bromine is the preferred halogen in those systems. Since the polyether polyamino methylene phosphonates described herein have been found to function surprisingly well as scale inhibitors under the severe conditions, including high pH, found in such aqueous systems, the present invention is concerned primarily with stabilizing those phosphonates against degradation by bromine. However, because it is also possible that chlorine, or a combination of bromine and chlorine may be employed in such systems, it is also within the scope of the present invention to stabilize those phosphonates against degradation by chlorine as well.

The chlorine and bromine biocides are added to the aqueous systems being treated in accordance with well-known procedures using various chlorine- and bromine-releasing agents, and sometimes the free halogen itself. For example, in the case of chlorine, gaseous chlorine may be fed directly into the water of the aqueous system, or it may be introduced by addition of the sodium or calcium hypochlorite salt, or other chlorine donors which are commonly used. For bromine, suitable bromide salts which may be used include the alkali and alkaline earth metal bromides, e.g., magnesium bromide, calcium bromide, sodium bromide, potassium bromide, ammonium bromide, especially crystalline sodium bromide dihydrate, etc. Such matters, however, do not form any part of the present invention, which is concerned with certain organic sulfonamides and their use with the polyether polyamino methylene phosphonates described herein to inhibit or prevent the degradation of the latter by the various active species which result from the presence of chlorine and/or bromine in an aqueous system under severe conditions.

The Organic Sulfonamide Stabilizers

The search for agents useful in inhibiting the degradation of the polyether polyamino methylene phosphonate scale inhibitors described herein under the severe conditions typically encountered in, e.g., cycled up recirculating cooling towers, has been complicated by (1) unpredictability and a poorly understood underlying mechanism of action, so that different results are obtained using the same candidate stabilizer but different phosphonate scale inhibitors; (2) the further requirement that the chlorine and bromine not be irreversibly bound by the stabilizing agent employed, so that they can continue their basic biocidal action in the aqueous system, and the corresponding degree to which the stabilizing agent is able to release the chlorine and bromine; (3) the often different results obtained with chlorine and bromine, due to the complex effect of pH, temperature and other factors, thus further increasing unpredictability; and (4) the further limitations and complexities imposed by the severe conditions under which the stabilizing agent must successfully perform.

For example, it may be theorized that the mode of action of the stabilizing agent is reaction with hypobromous acid to form a bromamine, which would give an expected order of effectiveness of candidate stabilizers of urea>dimethylhydantoin>sulfamic acid. But, with the widely used phosphonate scale inhibitor hydroxyethylidene-1,1-diphosphonate (HEDP), virtually the opposite order of effectiveness was found, i.e., dimethylhydantoin was almost ineffective, urea gave some benefit, and sulfamic acid was highly effective. On the other hand, when sulfamic acid was tried with HEDP and the polyether polyamino methylene phosphonates described herein, it was found to be less effective in preventing degradation of said phosphonates by bromine. Resorcinol was found to be effective in preventing degradation of the polyether polyamino methylene phosphonates by bromine, but so little bromine remained in solution that any aqueous system in which it was used would probably experience unacceptable biofouling.

Brief Description of the Prior Art

The polyether polyamino methylene phosphonates of the type which are to be used as the scale inhibiting active ingredient along with the organic sulfonamide stabilizing agents in the compositions of the present invention, are described in copending application Ser. No. 07/708,527, filed May 31, 1991 (Attorney Docket No. C-1527). While their use for the control of calcium carbonate scale under severe conditions which include elevated pH and high calcium carbonate saturation levels, is described, there is no suggestion of combining with them agents to provide improved resistance to degradation by oxidizing biocides.

U.S. Pat. Nos. 4,642,194 and 4,711,724 disclose methods for preventing decomposition by chlorine of certain specific phosphonate scale inhibitors, including HEDP and AMP, using sulfamic acid and cyanuric acid, respectively. However, there is no suggestion of either the polyether polyamino methylene phosphonate scale inhibitors used herein, or of the organic sulfonamide stabilizing agents of the present invention.

U.S. Pat. No. 4,759,852 discloses the use of sulfamic acid to prevent the decomposition of phosphonate scale inhibitors in cooling waters treated with a combination Of chlorine and a bromide salt which releases bromide ions. Only sulfamic acid is disclosed, and there is no suggestion of the polyether polyamino methylene phosphonate scale inhibitors with which the organic sulfonamides of the present invention are employed. Indeed, the phosphonates disclosed therein are unsuitable for the severe conditions under which the phosphonates of the present invention operate, since they have low calcium tolerances.

While the organic sulfonamides which are an essential part of the stabilizing compositions and methods of the present invention are known compounds, there is no suggestion in the prior art that they would be useful for preventing the degradation by chlorine and/or bromine of the polyether polyamino methylene phosphonate scale inhibitors described herein, when used to prevent scale in aqueous systems under severe conditions. Furthermore, organic sulfonamides may become ineffective as stabilizers due to precipitation by calcium or other cationic species such as magnesium, iron, manganese, silica, etc.

SUMMARY OF THE INVENTION

The present invention relates to an organic sulfonamide stabilizing composition for inhibiting the degradation of polyether polyamino methylene phosphonate scale inhibitors of the formula:

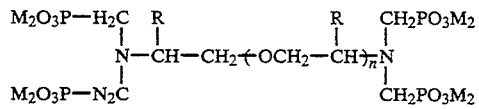

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl;

SAID DEGRADATION taking place in an aqueous system subject to the formation, deposition and adherence of scale imparting compounds, and being caused by a biocide present in said system comprising chlorine or bromine or mixtures thereof;

SAID ORGANIC SULFONAMIDE for addition to said aqueous system comprising a compound of the formula:

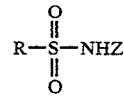

wherein:
Z is selected from hydrogen; and alkali and alkaline earth metal salt-forming ions; and
R is selected from the group consisting essentially of:
a) $C_{1-4}$alkoxy radical: —$OC_{1-4}$alkyl;
b) an amino group, or a mono($C_{1-4}$alkyl)amino or di ($C_{1-4}$alkyl)amino group: —$N(R^1)R^2$, where $R^1$ and $R^2$ are as defined above;
c) a formylamino group: —NHC(O)H;
d) ($C_{1-4}$alkyl)carbonylamino radical: —NHC(O)$C_{1-4}$alkyl;
e) ($C_{1-4}$alkoxy)carbonylamino radical: —NHC(O)O$C_{1-4}$alkyl;
f) $C_{2-6}$alkenyl radical;
g) $C_{2-6}$alkynyl radical;
h) $C_{3-7}$cycloalkyl radical;
i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: —$S(O)_nC_{1-4}$alkyl, where n=2; and a sulfamoyl group which is unsubstituted or substituted on the nitrogen by one or two $C_{1-4}$alkyl groups: —$SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: —$S(O)_nC_{1-4}$alkyl, where n=2;
j) $C_{1-4}$alkyl radical; and
k) $C_{1-4}$alkyl monosubstituted by one of the substituents a) through i) above.

The present invention further relates to a composition useful as a deposit control agent to control the formation, deposition and adherency of scale imparting compounds in an aqueous system containing a biocide comprising chlorine, bromine or mixtures thereof which tends to degrade said deposit control agent;

COMPRISING, IN COMBINATION

A) a polyether polyamino methylene phosphonate deposit control agent of the following formula:

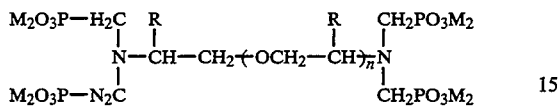

and optionally the N-oxides thereof, where n is an integer or fractional integer which is, or on average is, from about 2 to about 12; M is hydrogen or a suitable cation; and each R may be the same or different and is independently selected from hydrogen and methyl; and B) an organic sulfonamide stabilizing agent which inhibits degradation of component A) above, of the formula:

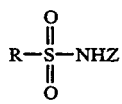

wherein:

Z is selected from hydrogen; and alkali and alkaline earth metal salt-forming ions; and R is selected from the group consisting essentially of:
a) $C_{1-4}$alkoxy radical: $-OC_{1-4}$alkyl;
b) an amino group, or a mono($C_{1-4}$alkyl)amino or di ($C_{1-4}$alkyl)amino group: $-N(R^1)R^2$, where $R^1$ and $R^2$ are as defined above;
c) a formylamino group: $-NHC(O)H$;
d) ($C_{1-4}$alkyl)carbonylamino radical: $-NHC(O)C_{1-4}$alkyl;
e) ($C_{1-4}$alkoxy)carbonylamino radical: $-NHC(O)OC_{1-4}$alkyl;
f) $C_{2-6}$alkenyl radical;
g) $C_{2-6}$alkynyl radical;
h) $C_{3-7}$cycloalkyl radical;
i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: $-S(O)_nC_{1-4}$alkyl, where n=2; and a sulfamoyl group which is unsubstituted or substituted on the nitrogen by one or two $C_{1-4}$alkyl groups: $-SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: $-S(O)_nC_{1-4}$alkyl, where n=2;
j) $C_{1-4}$alkyl radical; and
k) $C_{1-4}$alkyl monosubstituted by one of the substituents a) through i) above.

The present invention further relates to a composition useful as a deposit control agent to control the formation, deposition and adherence of scale imparting compounds in an aqueous system containing a biocide comprising chlorine, bromine or mixtures thereof which tends to degrade said deposit control agent,

COMPRISING, IN COMBINATION

A) a polyether polyamino methylene phosphonate or N-oxide deposit control agent of the formula above;

B) as an additional deposit control agent to enhance the performance of said phosphonate of A), one or more members selected from the group consisting essentially of homo- and copolymers including terpolymers comprising one or more of acrylamide, acrylic acid, 2-acrylamidomethyl propane sulfonic acid, methacrylic acid, itaconic acid, polyether esters of acrylic and methacrylic acids and polyethers based on polyethyleneoxide and polypropyleneoxide and mixtures thereof, including polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salt, and vinyl phosphonic acid, wherein the weight average molecular weight for such polymer additives is in the range of from about 500 to 250,000; and C) an organic sulfonamide stabilizing agent of the formula above which inhibits degradation of the phosphonate deposit control agent A) by the biocide comprising chlorine, bromine or mixtures thereof.

The present invention still further relates to a method of inhibiting the degradation of a polyether polyamino methylene phosphonate or N-oxide used to control the formation, deposition and adherence of scale-forming salts in an aqueous system containing a biocide comprising chlorine, bromine or mixtures thereof which tends to degrade said phosphonate, COMPRISING THE STEP OF TREATING said system with an amount of the organic sulfonamide of the formula above sufficient to provide a concentration ratio of organic sulfonamide to chlorine, bromine or mixture thereof of from 0.5:1 to 2.0:1, respectively. In particular, the present invention relates to such a method in which the treatment step comprises 1) adding the organic sulfonamide stabilizing agent to an aqueous system which already contains the phosphonate deposit control agent dissolved or dispersed therein; or 2) adding the organic sulfonamide stabilizing agent together with the phosphonate deposit control agent to the aqueous system to be treated as a single composition; or 3) adding the organic sulfonamide stabilizing agent either before, or simultaneously, with the phosphonate deposit control agent to the aqueous system to be treated, at the same point or different points in said system, but not as a single composition. In particular, the present invention also relates to the method described above in which calcium carbonate is the scale-forming salt, the aqueous system comprises a cooling tower and has been treated with bromine, and said organic sulfonamide is added to the aqueous system in an amount sufficient to establish a concentration ratio to the bromine of 1:1.

The present invention still further relates to the method described above for inhibiting the degradation of a polyether polyamino methylene phosphonate or N-oxide used to control the formation, deposition and adherence of scale-forming salts in an aqueous system containing a biocide comprising chlorine, bromine or mixtures thereof which tends to degrade said phosphonate, in which an additional deposit control agent to enhance the performance of said phosphonate is included in the treatment and may be added either together with said phosphonate as a single composition, or separately to the aqueous system to be treated at any time or point in said system specified above for addition of the phosphonate deposit control agent;

SAID ADDITIONAL DEPOSIT CONTROL AGENT COMPRISING one or more members selected from the group consisting essentially of: homo- and copolymers including terpolymers comprising one or more of acrylamide (AM), acrylic acid (AA), 2-acrylamide-methyl propane sulfonic acid (AMPSA), methacrylic acid (MAA), ethoxylated methacrylate, itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MA), maleic acid (MA), t-butyl acrylamide (TBAM), sodium styrene sulfonate, sodium vinyl sulfonate, hydroxy propyl acrylate, hydroxy propyl methacrylate, 3-allyloxy-2-hydroxy propane sulfonic acid (AHPS), sodium salt, and vinyl phosphonic acid, wherein the weight average molecular weight for such polymer additives is in the range of from about 500 to 250,000. In particular, the present invention relates to such a method in which calcium carbonate is the scale-forming salt, the aqueous system comprises a cooling tower and said biocide is bromine, and said additional deposit control agent polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5, 10 and 20 (having 5, 10 and 20 repeating oxyethylene units, respectively), and AA/AMPSA/TBAM.

DETAILED DESCRIPTION OF THE INVENTION

The present invention relates to an organic sulfonamide stabilizing composition for inhibiting the degradation of polyether polyamino methylene phosphonate scale inhibitors. Since these organic sulfonamide stabilizing agents have been found to be particularly useful with this type of phosphonate scale inhibitor/deposit control agent, the scope of these phosphonates will now be defined.

The Polyether Polyamino Methylene Phosphonate And Corresponding N-Oxide Scale Inhibitors The polyether phosphonates comprise compounds of the formula:

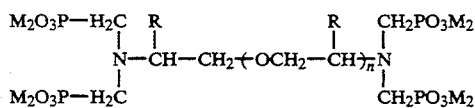

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl.

A preferred subclass of compositions of the above formula is that wherein M is hydrogen, R is methyl, and n is from about 2 to about 3, most preferably an average of about 2.6.

In order to obtain high levels of control of scale deposits, especially under the severe conditions defined herein, it has been found that there are certain essential components of the structure of such polyether polyamino methylene phosphonate or N-oxides which are necessary to provide that performance. For example, the N,N-bis(phosphonomethyl)amino portion of the structure is essential. Whether this group is present initially in the phosphonic acid form or as an alkali metal or other salt of the acid, has no critical bearing on the performance of the overall molecule. At the pH's under which the phosphonate compositions function, they are, and must be, in their ionized form. Thus, it is not critical whether "M" is hydrogen or a suitable cation, and the selection of an appropriate salt form is well within the skill of the art. Alkali metal salts are the most simple, and are preferred for that reason. Overall, however, it is preferred that M is hydrogen.

The polyether polyamino methylene phosphonate may be in the N-oxide form: N→O. As already described, this group confers significant resistance to degradation by chlorine and bromine biocides, or mixtures thereof, presumably by preventing oxidative attack on the nitrogen atom, of the group. However, because, as discussed previously, unreacted starting materials and side products containing phosphonomethylene and other groups subject to degradation by chlorine and bromine with release of detrimental $PO_4^{-3}$ ions are allowed to remain with the N-oxide final product, it is contemplated to be part of the present invention to add the organic sulfonamide stabilizing agents of the present invention to the N-oxide phosphonate deposit control agents, it being understood that these contain additional unspecified compositions subject to degradative attack.

A preferred, although not essential structural feature of the polyether polyamino methylene phosphonate and N-oxides useful as deposit control agents is the isopropyl group which bridges the diphosphonomethylamino group and the polyether group. This group can also be an ethylene moiety.

Another structural element of the phosphonate scale inhibitors is the polyether moiety. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products used as deposit control agents in conjunction with the organic sulfonamide stabilizing agents of the present invention.

In accordance with the processes set out in U.S. Pat No. 3,236,895 and related processes described in the prior art, it is possible to prepare any one of a number of desired polyether diamines within the scope of the present invention. In the general formula for the polyether polyamino methylene phosphonates used herein, the polyether moiety is simply represented by the formula:

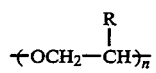

Since R may be hydrogen or methyl, both ethyleneoxy and propyleneoxy units are possible. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy):

EO; PO; EO—EO; PO—PO; EO—PO; EO—EO—EO; PO—PO—PO; EO—EO—PO; EO—PO—PO; EO—PO—EO; PO—EO—PO; EO—EO—EO—EO; PO—PO—PO—PO; EO—PO—PO—PO; EO—EO—PO—PO; EO—EO—EO—PO; EO—PO—EO—PO; EO—PO—PO—EO; PO—EO—EO—PO

In the above examples, "n" in the main formula would be an integer of from 1 to 4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the severe conditions of high pH and high calcite concentration, and thus are those which are preferred. Examples of some of these preferred phosphonates are shown in the table below, where Z=methylenephosphonate:

$$Z_2-N-\overset{R_z}{\underset{|}{C}}HCH_2-(OCH_2\overset{R_a}{\underset{|}{C}}H)_a-(OCH_2\overset{R_b}{\underset{|}{C}}H)_b-NZ_2$$

| Id. No. | a | b | $R_z$ | $R_a$ | $R_b$ |
|---|---|---|---|---|---|
| A | 2 | 1 | CH₃ | H | CH₃ |
| B | 2.6* | 0 | CH₃ | CH₃ | — |
| C | 2 | 0 | CH₃ | CH₃ | — |
| D | 8.5* | 1 | CH₃ | H | CH₃ |
| E | 5.6* | 0 | CH₃ | CH₃ | — |
| F | 2 | 0 | H | H | — |
| G | 3 | 0 | H | H | — |
| H | 3 | 0 | CH₃ | CH₃ | — |
| I | 3 | 1 | H | CH₃ | H |
| J | 4 | 0 | H | CH₃ | — |

\* = the value of "n" on average.

It will be noted from the table above that in several cases, "n" has an average value, i.e., the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to about 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy unit, 2 propyleneoxy units and 2 ethyleneoxy units, and so forth. The value of "n" may also represent an average number, and this is always the case, of course, when it is a fractional integer. In this case, for each of the ethyleneoxy and/or propyleneoxy units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have an isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall polyether polyamino methylene phosphonate or corresponding N-oxide, and thus plays a critical role in determining the scale inhibiting performance of that phosphonate. It has been found that in order to provide adequate scale control under the severe conditions of use defined herein, it is necessary that "n" be an integer or fractional integer which is, or on average is, from about 2 to about 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3, 4, 5 and so forth, in varying proportions. For example, a preferred polyether polyamino methylene phosphonate for use in the compositions and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e.g., "3", which usually designates a single molecular weight and not a molecular weight distribution.

The polyether polyamino methylene phosphonate and corresponding N-oxides of the compositions and methods of the present invention are prepared first by phosphonomethylation of the appropriate primary amine which already contains the polyoxyethylene and polyoxypropylene moieties, followed by an oxidation step which provides the N-oxide moieties.

Such primary amine starting materials and their method of preparation are well known. The phosphonomethylation of the primary amine is then carried out by a Mannich reaction such as that described in K. Moedritzer and R. Irani, *J. Organic Chem.* 31(5) 1603–7, "The Direct Synthesis of alpha-Aminomethyl Phosphonic Acids; Mannich-Type Reactions with Orthophosphorous Acid", May 1966. In a typical reaction, the primary amine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonate N-oxides of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with scale inhibition. Such side products, are consequently, usually allowed to remain, and the test data set out further below is based on test samples containing such side products. Consequently, the activity levels obtained would be even higher were 100% active compound being tested.

Once the desired phosphonomethylated polyoxypropylene diamine has been prepared as described above, the N-oxide final product of the present invention is then prepared by a step of oxidation, which may be accomplished, e.g., simply by adding hydrogen peroxide to a basic solution of the phosphonomethylated diamine and heating the reaction mixture, which gives high yields of the N-oxide final product. Of course, it is also possible to use other well known techniques for carrying out such a step of oxidation, and any number of these may be successfully employed.

The Organic Sulfonamide Stabilizing Agents

The key element of the present invention is the organic sulfonamide stabilizing agents which are used to prevent degradation of the polyether polyamino methylene phosphonate scale inhibitors described above, especially under the severe conditions of high pH and high calcite concentration. These organic sulfonamide stabilizing agents comprise compounds of the formula:

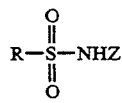

wherein:
Z is selected from hydrogen; and alkali and alkaline earth metal salt-forming ions; and
R is selected from the group consisting essentially of:
 a) $C_{1-4}$alkoxy radical: $-OC_{1-4}$alkyl;
 b) an amino group, or a mono($C_{1-4}$alkyl)amino or di ($C_{1-4}$alkyl)amino group: $-N(R^1)R^2$, where $R^1$ and $R^2$ are as defined above;
 c) a formylamino group: $-NHC(O)H$;
 d) ($C_{1-4}$alkyl)carbonylamino radical: $-NHC(O)C_{1-4}$alkyl;
 e) ($C_{1-4}$alkoxy)carbonylamino radical: $-NHC(O)OC_{1-4}$alkyl;
 f) $C_{2-6}$alkenyl radical;
 g) $C_{2-6}$alkynyl radical;
 h) $C_{3-7}$cycloalkyl radical;
 i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: $-S(O)_nC_{1-4}$alkyl, where $n=2$; and a sulfamoyl group which is unsubstituted or substituted on the nitrogen by one or two $C_{1-4}$alkyl groups: $-SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: $-S(O)_nC_{1-4}$alkyl, where $n=2$;
 j) $C_{1-4}$alkyl radical; and
 k) $C_{1-4}$alkyl monosubstituted by one of the substituents a) through i) above.

Preferred organic sulfonamide stabilizing agents for use in the present invention are those set out above wherein R is:
 $C_{1-4}$alkoxy radical: $-OC_{1-4}$alkyl;
 an amino group, or a mono($C_{1-4}$alkyl)amino or di($C_{1-4}$alkyl)amino group: $-N(R^1)R^2$, where $R^1$ and $R^2$ are independently H or $C_{1-4}$alkyl;
 phenyl mono-substituted by $C_{1-4}$alkyl, $C_{1-4}$alkoxy, or $-SO_2N(R^1)R^2$, where $R^1$ and $R^2$ are as defined above;
 $C_{1-4}$alkyl radical; or $C_{1-4}$alkyl monosubstituted by one of the substituents set out immediately above.

An especially preferred class of organic sulfonamides useful in the present invention is that wherein R is phenyl monosubstituted by $C_{1-4}$alkyl, and more particularly, para-substituted by methyl.

The organic sulfonamides described above are, for the most part, known in the art, and methods for their preparation are well known. One satisfactory approach to preparation of these compounds is by sulfonation of the appropriate amine with sulfur trioxide: $SO_3$. Another synthetic approach which may be used to prepare the organic sulfonamide stabilizers of the present invention is by treating ammonia, a primary amine, or a secondary amine with a sulfonyl chloride in the presence of some base. These and other methods are described in *Comprehensive Organic Chemistry: the Synthesis and Reactions of Organic Compounds*, Vol. 3, pp. 345-346, Derek Barton and W. David Ollis, eds., Pergamon Press 1979, as well as the literature references cited therein.

Other Aspects of the Compositions and Methods of the Present Invention

When any of the polyether polyamino methylene phosphonates or corresponding N-oxides used in the compositions of the present invention are used to inhibit the precipitation, deposition, and adherence of scale-forming salts in an aqueous system, they can be effectively employed for that purpose when added in amounts sufficient to establish a concentration in said aqueous system of from 1 to 100 mg/L. Preferably, the amount added will be sufficient to establish a concentration of from 5 to 75 mg/L, and most preferably, the amount added will be sufficient to establish a concentration of from 10 to 50 mg/L of the composition. It is understood, however, that many factors, of the type which have been explained in detail with regard to the background to the present invention, will determine the actual amount of the polyether polyamino methylene phosphonate N-oxide compositions of the present invention which will be added to any particular aqueous system in order to achieve the maximum amount of inhibition of alkaline earth metal, especially calcium carbonate scale formation, deposition and adherence in that aqueous system. The calculation of those amounts is well within the skill of the artisan in this field.

When the polyether polyamino methylene phosphonate and corresponding N-oxide compositions of the present invention are used in combination with one or more of the polymers recited further above, the amounts of that combination which must be added in order to inhibit the formation, deposition and adherence of scale-forming salts in an aqueous system, will as a general matter be within the ranges of amounts sufficient to establish the ranges of concentrations of the polyether polyamino methylene phosphonate and corresponding N-oxides used alone, as recited in detail above. Again, however, calculation of the actual amount is well within the skill of the art.

The overall amount, and particularly the concentration of organic sulfonamide stabilizing agent which must be employed in the method of the present invention for inhibiting the degradation of the polyether polyamino methylene phosphonates used as scale inhibitors, depends on a number of factors, including especially pH, concentration of the chlorine and/or bromine biocide, and temperature and organic and inorganic constituents of the water which makes up the aqueous system being treated. With regard particularly to the concentration of the chlorine and/or bromine biocide in the aqueous system, it is desirable that the corresponding concentration of the organic sulfonamide stabilizing agent be in an eqivalent weight ratio thereto (sulfonamide:halogen) of from 0.5 to 2.0, preferably from 0.75 to 1.25, most preferably about 1.0. In general terms, the concentration of the organic sulfonamide will be from 0.1 to 100 ppm, preferably from 0.5 to 25, most preferably from 1 to 10 ppm in the aqueous system being treated by the polyether polyamino methylene phosphonate scale inhibitor. For example, the organic sulfonamide stabilizing agents of the present invention will be added to such an aqueous system at a concentration of between 0.5 and 25 ppm, said system being at a pH of from 7 to 12, at a temperature of from 5° to 80° C., and having a chlorine and/or bromine concentration of between 0.1 and 50 ppm, usually 0.1 to 10 ppm.

The manner of addition of any particular organic sulfonamide stabilizing agent composition of the present invention to an aqueous system will be straightforward to a person of ordinary skill in this art. It may be added in liquid form by mechanical dispensers of known design. It may also be added in diluted liquid form. The organic sulfonamide stabilizing agent may also be combined with the polyether polyamino methylene phosphonate and corresponding N-oxide scale inhibitor composition, as well as other chemical treatment agents for dispensing to the aqueous system; and these in combination may be dispensed in liquid form.

As has already been noted, the present invention relates to a method in which the treatment step comprises 1) adding the organic sulfonamide stabilizing agent to an aqueous system which already contains the phosphonate deposit control agent dissolved or dispersed therein; or 2) adding the organic sulfonamide stabilizing agent together with the phosphonate deposit control agent to the aqueous system to be treated as a single composition; or 3) adding the organic sulfonamide stabilizing agent either before, or simultaneously, with the phosphonate deposit control agent to the aqueous system to be treated, at the same point or different points in said system, but not as a single composition. All that is required, essentially, is that the phosphonate scale inhibitor and the organic sulfonamide stabilizing agent be present in the aqueous system being treated at the same time when that system contains a chlorine and/or bromine biocide which has a tendency to degrade said phosphonate scale inhibitor. From the standpoint of convenience, is is preferred, of course, to adopt the procedure of 2) above and simply add the phosphonate scale inhibitor and the organic sulfonamide stabilizing agent together as a single treatment composition to the aqueous system.

The method of the present invention also contemplates use of an additional deposit control agent to enhance the performance of the phosphonate scale inhibitor, which may be added either together with said phosphonate as a single composition, or separately to the aqueous system to be treated at any time or point in said system for addition of the phosphonate. For example, there could be used in such a combination one or more members selected from the group consisting of homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MA), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid. Weight average molecular weights for such polymer additives should range from about 500 to 250,000.

For example, such compositions include copolymers of 90/10 to 10/90 AA/AMPSA, preferably 75/25 and 60/40 AA/AMPSA. Other preferred polymer additives for use with the polyether polyamino methylene phosphonate N-oxides of the present invention include 100 AA, 75/25 SSS/MA, 33/33/34 AA/MAA/IA, 50/50 AA/AM, 70/20/10 AA/AMPSA/PGM-5, 10 and 20 (having 5, 10 and 20 repeating oxyethylene units, respectively), and AA/AMPSA/TBAM. Combinations using these polymers together with the polyether polyamino methylene phosphonate and corresponding N-oxide compositions increase the amount of scale control and deposit control which is achieved, especially under the severe conditions described herein. The ratio of polymer additive to phosphonate can be as high as 1:1 down to as little as 1:10, with the preferred range being between 1:2 and 1:5.

As has already been noted, the chlorine and bromine biocides are added to the aqueous systems being treated in accordance with well-known procedures using various chlorine- and bromine-releasing agents, and sometimes the free halogen itself. For example, in the case of chlorine, gaseous chlorine may be fed directly into the water of the aqueous system, or it may be introduced by addition of the sodium or calcium hypochlorite salt, or other chlorine donors which are commonly used. For bromine, suitable bromide salts which may be used include the alkali and alkaline earth metal bromides, e.g., magnesium bromide, calcium bromide, sodium bromide, potassium bromide, ammonium bromide, especially crystalline sodium bromide dihydrate, etc.

Concerning the organic sulfonamide stabilizing agents of the present invention and their use, the phrase "inhibiting the degradation", with regard to their effect on the phosphonate scale inhibitors, is intended to mean all degrees of such inhibition, up to and including, total prevention of such degradation by the chlorine and/or bromine biocides which tend to cause such degradation. The term "degradation", in turn, means primarily cleavage of the methylenephosphonate group or groups in the phosphonate scale inhibitor product whereby orthophosphate ion is released with the detrimental effects described earlier, together with total or partial loss of the scale inhibiting activity of the phosphonate product. The term "degradation", however, is also intended to mean any decomposition, deterioration, or other detrimental change in composition of the phosphonate scale inhibitors used herein, which is caused directly or indirectly by the chlorine and/or bromine biocides present in the aqueous system to which the phosphonate scale inhibitors are added, and which is inhibited by the organic sulfonamide stabilizing agents of the present invention.

With regard to the phosphonate scale inhibitors, as well as their combination with the polymer additives described above, the phrases "inhibiting the precipitation" and "inhibiting the formation and deposition" are meant to include threshold inhibition, dispersion, solubilization, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple physical means as opposed to harsh mechanical or chemical treatment.

The phrase "scale-forming salts" is meant to include any of the scale-forming salts selected from the group consisting essentially of calcium carbonate, calcium phosphate, calcium phosphonate (including calcium hydroxyethylidene diphosphonic acid), and the corresponding magnesium salts.

The phrase "aqueous system" means commercial or industrial systems utilizing water and involving heat exchange surfaces, usually of metal, including cooling water systems including cooling towers, boiler water systems, desalination systems, gas scrubbers, and thermal conditioning equipment. Of particular importance are those systems which operate under severe conditions as detailed herein, including at least high pH and high calcite concentrations. Typical of such systems are cycled up cooling towers, reverse osmosis systems, sugar refining evaporators, and certain types of gas scrubbers.

In the embodiments of the present invention described herein, it has been contemplated that, as a practical matter, only a single polyether polyamino methylene phosphonate or corresponding N-oxide composition of those described above would be used for the purpose of inhibiting scale. Of course, it would be possible to employ more than one such compound, and that forms a part of the present invention.

EXAMPLES OF PREFERRED EMBODIMENTS

The following examples are presented for the purpose of illustrating the present invention, but are not intended to be in any way a limitation thereof.

EXAMPLE 1

General Procedure for Evaluation of Phosphonate Decompositon

The decomposition of polyether polyamino methylene phosphonates was measured by following the rate of appearance of orthophosphate, which is a decomposition product. Tests were run in 8 liter cells equipped with pH and temperature controls, and containing water of the composition set out below:

| Ion | mg/L |
| --- | --- |
| $Ca^{2+}$ | 100 |
| $Mg^{2+}$ | 25 |
| $Na^+$ | 75 |
| $SO_4^{2-}$ | 200 |
| $SiO_2$ | 18 |
| $Cl^-$ | 200 |
| Alkalinity (as $HCO_3$): for | |
| pH 7.5 | 86 |
| pH 8.5 | 309 |

The polyether polyamino methylene phosphonate of the general formula in which M=H, R=$CH_3$ in all cases, and n=on average about 2.6, was added to the test vessel so as to result in a concentration of 10 mg/L in the water therein. Chlorinations were performed by pipeting the appropriate amount of 8.0 g/L chlorine as $Cl_2$ into the 8 liter test cells to attain the desired residual. This stock solution was prepared fresh daily and standardized using the Calgon Methyl Orange Field Test for chlorine. Bromine was added semi-continuously to maintain 0.4–0.6 ppm of bromine (as $Cl_2$), and bromine levels were determined using the Calgon Field Test for bromine. The bromine stock was made by combining equal molar concentrations of sodium hypochlorite and sodium bromide. The sodium bromide stock solution contained 11.61 g of NaBr per liter, which is equivalent to 8 g/L as chlorine on a molar basis. For these tests, two milliliters of NaBr and HOCl were combined, resulting in a 4 g/L bromine solution (measured as active chlorine). This solution converts all chlorine to bromine. An aliquot of this solution was then added to the test cell to achieve the desired bromine concentration. During the tests, halogen levels were determined frequently. Additional slugs of halogen were added when needed to maintain free halogen residuals between 0.4 and 0.6 ppm.

Temperature was maintained at 30.6° C., while the pH was maintained continuously at 8.5±0.2 with the addition of sulfuric acid as needed. Samples were taken at regular intervals for orthophosphate analysis. From these, degradation rates were calculated. Total and orthophosphate were analyzed using standard procedures. Total phosphate is the combination of organic and orthophosphate. Total phosphate was determined after digestion by boiling in the presence of acid and persulfate. Orthophosphate determination involves its reaction with ammonium molybdate and antimony potassium tartrate to form an antimony-phosphate-molybdate complex. Both procedures rely on this complex being further reduced by ascorbic acid to produce molybdenum blue. The color intensity is a function of concentration amenable to measurement with a spectrophotometer.

Following the procedures described above, the halogen stability, i.e., the % phosphonate remaining in solution after certain elapsed times, was determined for the starting material. The percent orthophosphate released is the amount of orthophosphate found divided by the total amount of orthophosphate that would be available if 100% decomposition occurred.

A comparison was also made of the ability of sulfamic acid, a known stabilizer for chlorine, and methylsulfonamide (MSA), a stabilizing agent of the present invention, to prevent decomposition of the starting material phosphonate described above. The results obtained are illustrated in the following table of values.

TABLE 1

Orthophosphate Release by 10 ppm Test Phosphonate In the Presence of 0.5 ppm $Br_2$

| TIME (Hrs.) | NO STABILIZER % o-PO$_4$ Released | 2 ppm MSA % o-PO$_4$ Released | 2 ppm SULFAMIC ACID % o-PO$_4$ Released |
|---|---|---|---|
| 0 | 0.07 | 0.98 | 0.90 |
| 0.5 | 11.05 | 1.73 | 3.25 |
| 1.0 | — | 1.90 | 3.45 |
| 1.5 | 16.52 | 1.97 | 4.18 |
| 2.0 | 16.75 | 2.41 | 4.63 |
| 3.0 | 18.11 | 2.71 | 4.71 |
| 4.0 | 20.95 | 2.78 | 5.11 |
| 5.0 | 21.12 | 3.49 | 5.64 |
| 6.0 | 22.26 | 3.75 | 5.45 |
| 7.0 | 23.03 | 3.94 | 6.86 |
| 12.0 | | | 8.15 |
| 13.0 | | | 9.06 |
| 14.0 | | | 10.05 |
| 15.0 | | | 10.21 |
| 16.0 | | | 10.24 |
| 17.0 | | | 10.70 |
| 18.0 | | | 10.66 |
| 19.0 | | | 10.80 |

As shown by the data above, within 7 hours, approximately 23% of the phosphonate test compound without stabilizing agent had decomposed. However, 11% of that decomposition occurred in the first 30 minutes. This relatively rapid, initial degradation rate is probably due to the breakdown of impurities, i.e., unreacted starting materials and various side products, in the test sample; and analysis of that sample revealed about 11% of such impurities. Also supporting this conclusion is the lack of correlation between the rapid rate of appearance of orthophosphate and the expected rate of appearance from first order or second order kinetic models of reaction for the phosphonate test sample. Thus, two distinct reactions are indicated, one for the impurities and one for the phosphonate test sample.

The test data above also shows that while the sulfamic acid was effective in reducing the rate of decomposition of the phosphonate test sample by bromine, it was not as effective as the MSA. After 7 hours, the decomposition was reduced from about 23% with no stabilizer to about 10% with sulfamic acid, and to about 3% with MSA. MSA is therefore from 3–4 times more effective than sulfamic acid, and MSA slows the rate of decomposition of the initial reaction which may be due to impurities by about twenty fold.

EXAMPLE 2

Toluenesulfonamide (TSA) Stabilizing Agent

Following the procedures of Example 1 above, toluenesulfonamide (TSA), a stabilizing agent of the present invention, was evaluated for its ability to inhibit the decomposition of the same phosphonate scale inhibitor as used in Example 1, by bromine. The results of that evaluation are shown in the following table of values.

TABLE 2

Orthophosphate Release by 10 ppm Test Phosphonate In the Presence of 0.5 ppm $Br_2$

| TIME (Hrs.) | NO STABILIZER % o-PO$_4$ Released | 2 ppm TSA % o-PO$_4$ Released |
|---|---|---|
| 0.5 | 10.35 | 1.50 |
| 1.0 | — | 2.09 |
| 1.5 | 15.81 | 2.01 |
| 2.0 | 16.04 | 2.19 |
| 3.0 | 17.40 | 2.71 |
| 4.0 | 20.25 | 2.79 |
| 5.0 | 20.42 | 3.17 |
| 6.0 | 21.55 | 3.82 |
| 7.0 | 22.32 | — |

What is claimed is:

1. An aqueous system containing scale-forming salts and characterized by high pH and high calcite saturation levels wherein the pH is at least 8.5 and the calcite saturation level is at least 150 times the solubility limit of calcium as calcite, and further characterized by the presence of a biocide therein comprising chlorine or bromine or mixtures thereof;

said aqueous system further containing, in an amount sufficient to establish a concentration of from 10 to 50 mg/L, of a polyether polyamino methylene phosphonate of the formula:

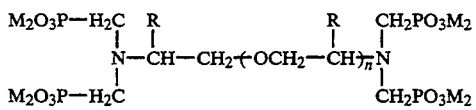

and optionally the N-oxides thereof, where n is an integer or fractional integer which is, or on average is, from about 2 to about 12; M is hydrogen or a cation; and each R may be the same or different and is independently selected from hydrogen and methyl;

said phosphonate being subject to degradation by said biocide, wherefore said aqueous system also further contains an organic sulfonamide stabilizing composition for inhibiting said degradation comprising an organic sulfonamide stabilizing agent which inhibits degradation of component A) above, of the formula:

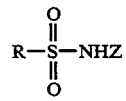

wherein:
Z is selected from hydrogen; and alkali and alkaline earth metal salt-forming ions; and
R is methyl, phenyl, or phenyl substituted by methyl; sufficient to provide a concentration ratio, based on equivalent weights, of organic sulfonamide to chlorine, bromine or mixtures thereof of from 0.5:1 to 2.0:1, respectively.

2. An aqueous system according to claim 1 wherein for the phosphonate being stabilized, M is hydrogen, R is methyl in all occurrences, and n is about 2.6; the biocide is bromine, and the organic sulfonamide stabilizing compound is selected from the group consisting of toluenesulfonamide, methane sulfonamide, and benzene sulfonamide.

3. An aqueous system according to claim 1 wherein n is about 2.6.

4. An aqueous system according to claim 3 wherein said organic sulfonamide stabilizing composition is toluenesulfonamide.

5. An aqueous system containing scale-forming salts and characterized by high calcite saturation wherein the pH is at least 8.5 and the calcite saturation level is at least 150 times the solubility limit of calcium as calcite, and further characterized by the presence of a biocide therein comprising chlorine or bromine or mixtures thereof;

said aqueous system further containing, in an amount sufficient to establish a concentration of from 10 to 50 mg/L, of a polyether polyamino methylene phosphonate deposit control agent of the following formula:

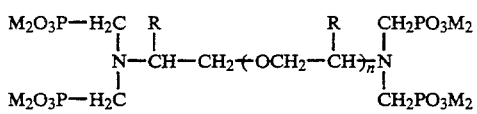

and optionally the N-oxides thereof, where n is an integer or fractional integer which is, or on average is, from about 2 to about 12; M is hydrogen or a cation; and each R may be the same or different and is independently selected from hydrogen; said phosphonate being subject to degradation by said biocide, wherefore said aqueous system also further contains an organic sulfonamide stabilizing composition for inhibiting said degradation comprising a compound of the formula:

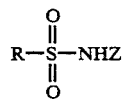

wherein:
Z is selected from hydrogen; and alkali and alkaline earth metal salt-forming ions; and
R is methyl, phenyl, or phenyl substituted by methyl; sufficient to provide a concentration ratio, based on equivalent weights, of organic sulfonamide to chlorine, bromine or mixture thereof of from 0.5:1 to 2.0:1, respectively; and
said aqueous system also further contains an additional deposit control agent to enhance the performance of said polyether polyamino methylene phosphonate with one or more homo-polymers, copolymers, and terpolymers comprising one or more of acrylamide (AM), acrylic acid (AA), 2-acrylamidomethyl propane sulfonic acid (AMPSA), methacrylic acid (MAA), itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), sodium salt, and vinyl phosphonic acid, wherein the weight average molecular weight for such polymer additives is in the range of from about 500 to 250,000.

6. An aqueous system according to claim 5 wherein said additional deposit control agent is a member selected from the group consisting essentially of AA/AMPSA, AA, SSS/MA, AA/MAA/IA, AA/AM, AA/AMPSA/PGM-5, 10 and 20 (having 5, 10 and 20 repeating oxyethylene units, respectively), and AA/AMPSA/TBAM.

7. An aqueous system according to claim 6 wherein for said polyether polyamino methylene phosphonate, M is hydrogen, R is methyl in all occurrences, and n is about 2.6; said additional deposit control agent is AA/AMPSA/PGM-5 (having 5 repeating oxyethylene units); and said organic sulfonamide stabilizing composition is toluenesulfonamide.

8. A composition useful as a deposit control agent to control the formation, deposition and adherence of scale imparting compounds in an aqueous system containing a biocide comprising chlorine, bromine or mixtures thereof which tends to degrade said deposit control agent, COMPRISING IN COMBINATION:
A) a polyether polyamino methylene phosphonate deposit control agent of the following formula:

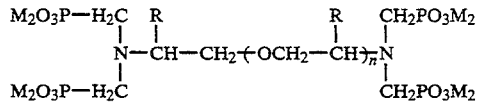

and optionally the N-oxides thereof, where n is about 2.6; M is hydrogen, and R is methyl in all occurrences;
B) an additional deposit control agent to enhance the performance of said phosphonate of A), wherein said additional deposit control agent is AA/AMPSA/PGM-5 (having 5 repeating oxyethylene units), wherein the weight average molecular weight for said additional deposit control agent is in the range of from about 500 to 250,000; and
C) an organic sulfonamide stabilizing agent which inhibits degradation of component A) above, wherein said organic sulfonamide stabilizing agent is toluenesulfonamide.

* * * * *